US009501351B2

(12) United States Patent
Kim et al.

(10) Patent No.: US 9,501,351 B2
(45) Date of Patent: Nov. 22, 2016

(54) MEMORY CONTROL UNIT AND DATA STORAGE DEVICE INCLUDING THE SAME

(71) Applicant: SK hynix Inc., Gyeonggi-do (KR)

(72) Inventors: Jae Woo Kim, Gyeonggi-do (KR); Joong Hyun An, Gyeonggi-do (KR); Kwang Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 187 days.

(21) Appl. No.: 14/500,515

(22) Filed: Sep. 29, 2014

(65) Prior Publication Data
US 2015/0309865 A1    Oct. 29, 2015

(30) Foreign Application Priority Data

Apr. 23, 2014 (KR) ........................ 10-2014-0048501

(51) Int. Cl.
*G06F 11/10* (2006.01)
*G06F 11/00* (2006.01)
*G06F 13/28* (2006.01)
*G06F 9/30* (2006.01)
*G06F 12/10* (2016.01)
*G06F 12/08* (2016.01)

(52) U.S. Cl.
CPC ....... *G06F 11/1008* (2013.01); *G06F 9/30192* (2013.01); *G06F 11/00* (2013.01); *G06F 12/0835* (2013.01); *G06F 12/1081* (2013.01); *G06F 13/28* (2013.01); *G06F 2212/40* (2013.01); *G06F 2212/403* (2013.01); *G06F 2213/28* (2013.01); *G06F 2213/2802* (2013.01)

(58) Field of Classification Search
CPC .... G06F 11/00; G06F 11/1008; G06F 13/28; G06F 12/1081; G06F 2213/28; G06F 2213/2802; G06F 2212/40; G06F 2212/403; G06F 9/30192; G06F 12/0835

USPC ...... 714/766, 763, 764, 768, 773, 774, 6.21, 714/42; 365/200, 201
See application file for complete search history.

(56) References Cited

U.S. PATENT DOCUMENTS

| | | | |
|---|---|---|---|
| 4,392,201 A * | 7/1983 | Brown ................... | G11C 29/26 711/3 |
| 4,445,172 A * | 4/1984 | Peters ................. | G06F 12/0851 711/3 |
| 6,587,977 B1 * | 7/2003 | Riggle .................. | H03M 5/145 341/59 |
| 7,640,375 B2 * | 12/2009 | Haneda .................... | G06F 13/28 710/22 |
| 7,664,902 B1 * | 2/2010 | Chow .................. | G06F 12/1416 710/16 |
| 8,090,936 B2 * | 1/2012 | Fallon .................. | G06F 3/0613 711/113 |
| 8,411,677 B1 * | 4/2013 | Colloff .................... | H04L 69/22 370/389 |
| 8,934,535 B2 * | 1/2015 | Fallon .................... | H03M 7/30 375/240.01 |
| 9,311,180 B2 * | 4/2016 | Takahashi ............... | G06F 11/10 |
| 9,350,386 B2 * | 5/2016 | Park ...................... | H03M 13/09 |
| 2004/0032771 A1 * | 2/2004 | Kusano ............ | G11B 20/00007 365/202 |
| 2005/0216605 A1 * | 9/2005 | Muro ...................... | G06F 13/28 710/5 |
| 2006/0155895 A1 * | 7/2006 | Matsuda .................... | G06F 7/02 710/52 |
| 2006/0161694 A1 * | 7/2006 | Tomozaki ............... | G06F 13/28 710/22 |

(Continued)

*Primary Examiner* — John J Tabone, Jr.
(74) *Attorney, Agent, or Firm* — IP & T Group LLP

(57) ABSTRACT

A data storage device includes a storage memory device; a signal generation block suitable for generating control signals to be provided to the storage memory device; and an error correction code (ECC) block suitable for ECC-encoding data to be stored in the storage memory device, wherein the ECC block operates before the signal generation block.

18 Claims, 8 Drawing Sheets

(56) References Cited

U.S. PATENT DOCUMENTS

| | | | |
|---|---|---|---|
| 2007/0040938 A1* | 2/2007 | Choi | H04L 27/02 348/470 |
| 2007/0226590 A1* | 9/2007 | Nagai | G06F 11/1008 714/763 |
| 2008/0019303 A1* | 1/2008 | Baek | H04L 5/0058 370/328 |
| 2008/0140921 A1* | 6/2008 | Sutardja | G06F 3/0611 711/103 |
| 2009/0287858 A1* | 11/2009 | Kawahara | G06F 13/28 710/22 |
| 2010/0070821 A1* | 3/2010 | Kim | G06F 11/1008 714/752 |
| 2010/0088574 A1* | 4/2010 | Kim | G06F 11/1008 714/763 |
| 2010/0128376 A1* | 5/2010 | Tanabe | G11B 5/02 360/31 |
| 2010/0169550 A1 | 7/2010 | Akita et al. | |
| 2010/0180083 A1* | 7/2010 | Lee | G06F 12/0846 711/128 |
| 2010/0235684 A1* | 9/2010 | Muro | G06F 11/27 714/37 |
| 2011/0010603 A1* | 1/2011 | Yang | G06F 11/1068 714/755 |
| 2011/0016263 A1* | 1/2011 | Lin | G11C 29/02 711/103 |
| 2011/0138221 A1* | 6/2011 | Hanaoka | G06F 11/1441 714/6.1 |
| 2011/0173488 A1* | 7/2011 | Blumrich | G06F 11/1438 714/4.1 |
| 2011/0261155 A1* | 10/2011 | Tsuruga | H04N 13/0051 348/43 |
| 2011/0276857 A1* | 11/2011 | Kim | G06F 11/1048 714/763 |
| 2012/0075930 A1* | 3/2012 | Patapoutian | G11C 11/5628 365/185.03 |
| 2012/0079355 A1* | 3/2012 | Patapoutian | G06F 11/1048 714/780 |
| 2012/0113220 A1* | 5/2012 | Otsuka | H04N 13/0029 348/43 |
| 2012/0221775 A1* | 8/2012 | Kim | G06F 21/00 711/103 |
| 2012/0284589 A1* | 11/2012 | Kim | G06F 11/1012 714/785 |
| 2013/0086311 A1* | 4/2013 | Huang | G06F 13/1689 711/103 |
| 2013/0275830 A1* | 10/2013 | Park | H03M 13/09 714/758 |
| 2015/0113355 A1* | 4/2015 | Kang | G06F 11/1048 714/764 |
| 2015/0199234 A1* | 7/2015 | Choi | G11C 29/42 714/764 |
| 2015/0280742 A1* | 10/2015 | Liu | G06F 12/0802 714/758 |
| 2015/0286410 A1* | 10/2015 | Park | G06F 3/0604 711/154 |
| 2015/0309943 A1* | 10/2015 | Kim | G06F 12/1081 710/308 |
| 2015/0363351 A1* | 12/2015 | Sato | G06F 13/28 710/105 |
| 2016/0011818 A1* | 1/2016 | Hashimoto | G11C 16/3495 711/103 |

* cited by examiner

MEMORY CONTROL UNIT AND DATA STORAGE DEVICE INCLUDING THE SAME

CROSS-REFERENCES TO RELATED APPLICATION

The present application claims priority under 35 U.S.C. §119(a) to Korean application number 10-2014-0048501, filed on Apr. 23, 2014, in the Korean Intellectual Property Office, which is incorporated herein by reference in its entirety.

BACKGROUND

1. Technical Field

Various embodiments relate to a data storage device, and more particularly, to a memory control unit capable of improving operation speed and a data storage device including the same.

2. Related Art

Recently, the paradigm for the computer environment has changed to ubiquitous computing so that computer systems can be used anytime and anywhere. Due to this fact, the use of portable electronic devices such as mobile phones, digital cameras, and notebook computers has rapidly increased. In general, such portable electronic devices use a data storage device including a memory device. The data storage device stores data used in the portable electronic devices.

A data storage device including a memory device provides advantages in that, since there are no moving parts, stability and durability are excellent, information access speed is high and power consumption is small. Data storage devices having such advantages include a universal serial bus (USB) memory device, memory cards having various interfaces, a universal flash storage (UFS) device, and a solid state drive (SSD).

SUMMARY

In an embodiment of the present disclosure, a data storage device may include a storage memory device; a signal generation block suitable for generating control signals to be provided to the storage memory device; and an error correction code (ECC) block suitable for ECC-encoding data to be stored in the storage memory device, wherein the ECC block operates before the signal generation block.

In an embodiment of the present disclosure, a memory control unit may include a direct memory access (DMA) block; an error correction code (ECC) block suitable for ECC-encoding data provided from the DMA block; a signal generation block suitable for generating a data signal and a control signal to be provided to the memory device; and an instruction push block suitable for sequentially instructing the DMA block to read the data, the ECC block to ECC-encode the data, and the signal generation block to generate the data signal based on the encoded data, and generate the control signal.

In an embodiment of the present disclosure, a data storage device may include a storage memory device; a control unit suitable for generating a descriptor, which describes a work for controlling the storage memory device; a signal generation block suitable for generating a control signal to be provided to the storage memory device; an error correction code (ECC) block suitable for ECC-encoding data to be stored in the storage memory device; and a descriptor processing block suitable for providing encoding information, which instructs the ECC block to ECC-encode the data, to the ECC block and then providing an instruction set, which instructs generation of the control signal, to the signal generation block based on the descriptor.

In an embodiment of the present disclosure, a control apparatus for controlling a storage device may include an instruction unit suitable for generating an instruction, an encoding information, and a data request; an ECC unit suitable for ECC-encoding data based on the encoding information; a signal generation unit suitable for generating a control signal for controlling the storage memory device, and a data signal for storing the ECC-encoded data in the storage device in response to the instruction; and a buffer unit suitable for buffering the data provided from an external, and providing the data buffered therein to the ECC unit based on the data request, wherein the instruction unit provides the instruction, the encoding information, and the data request so that the ECC unit completes the ECC-encoding on or before the generation of the control signal.

According to the embodiments of the present disclosure, since an encoding operation may be completed on or before generation of a control signal to be provided to a storage memory device, the operation speed of a data storage device may be improved.

BRIEF DESCRIPTION OF THE DRAWINGS

Features, aspects, and embodiments are described in conjunction with the attached drawings, in which.

DETAILED DESCRIPTION

Figure 1:
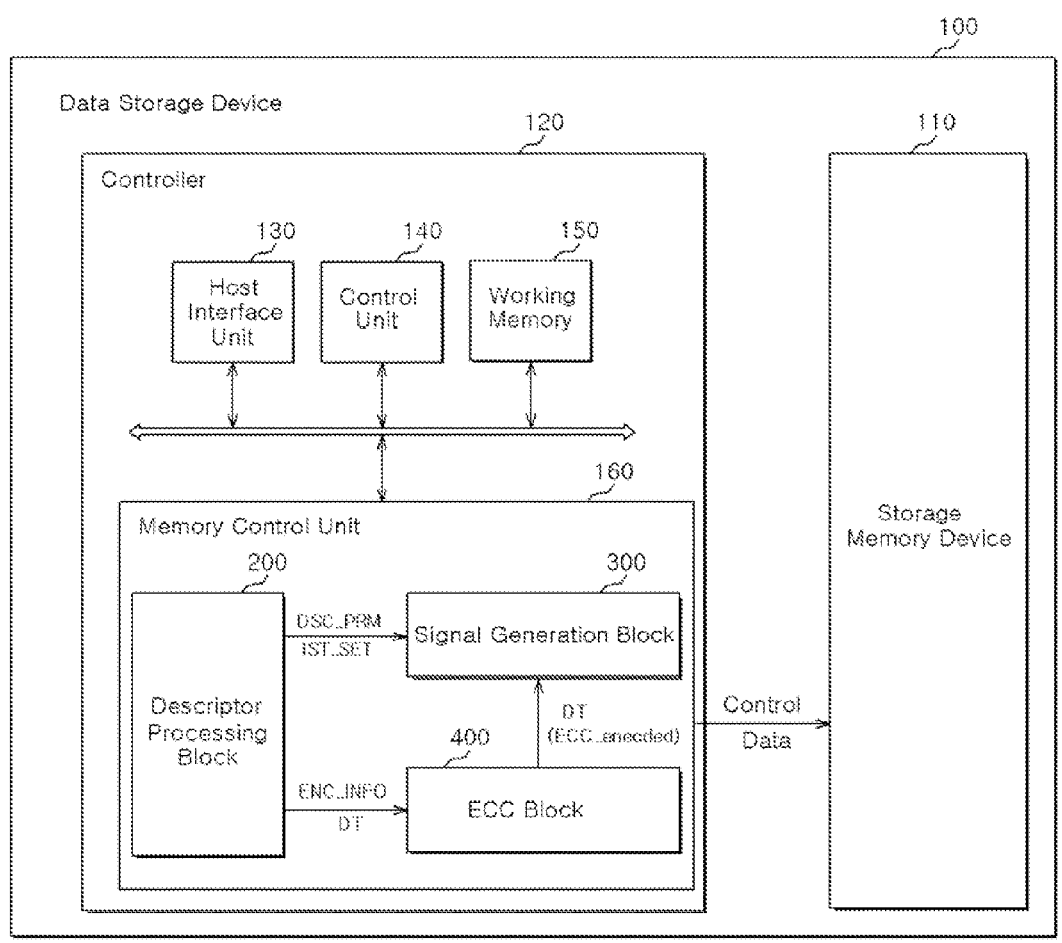
FIG. 1 is a block diagram exemplarily illustrating a data storage device in accordance with an embodiment of the present disclosure.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can apply the concept of the present invention.

It is to be understood herein that embodiments of the present invention are not limited to the particulars shown in the drawings and that the drawings are not necessarily to scale and, in some instances, proportions may have been exaggerated in order to more clearly depict certain features of the invention. While particular terminology is used, it is to be appreciated that the terminology used herein is for the purpose of describing particular embodiments only and is not intended to limit the scope of the present invention.

In this document, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, and vice versa, unless the context dearly indicates otherwise. It will be further understood that the terms "includes" and/or "including," when used in this specification, specify the presence of at least one stated feature step, operation, and/or element, but do not preclude the presence or addition of one or more other features, steps, operations, and/or elements thereof.

A memory control unit and a data storage device including the same according to the present disclosure will be described below with reference to the accompanying drawings through exemplary embodiments.

FIG. 1 is a block diagram exemplarily illustrating a data storage device 100 in accordance with an embodiment of the present disclosure. The data storage device 100 may store data to be accessed by a host device (not shown) such as a mobile phone, an MP3 player a laptop computer, a desktop computer, a game player, a TV, an in-vehicle infotainment system, and so forth. The data storage device 100 may also be referred to as a memory system.

The data storage device 100 may be manufactured as any one of various kinds of storage devices according to the protocol of an interface which is electrically coupled with the host device. For example, the data storage device 100 may be configured as any one of various kinds of storage devices such as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so forth.

The data storage device 100 may be manufactured as any one of various kinds of package types. For example, the data storage device 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 100 may include a storage memory device 110 and a controller 120.

The storage memory device 110 may operate as the storage medium of the data storage device 100. For example, the storage memory device 110 may be constituted by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The FRAM, the MRAM, the PCRAM and the RERAM are kinds of nonvolatile random access memory devices capable of random access to memory cells. For example, the storage memory device 110 may be constituted by a combination of a NAND type flash memory device and one or more of the various types of nonvolatile random access memory devices described above.

The controller 120 may control the general operations of the data storage device 100 through driving of the firmware or the software loaded on a working memory 150 that is disposed in the controller 120. The controller 120 may decode or drive a code type instruction or algorithm such as firmware or software. The controller 120 may be realized in hardware or in a combination of hardware and software.

The controller 120 may include a host interface unit 130, a control unit 140, the working memory 150, and a memory control unit 160. The memory control unit 160 may also be referred to as a memory interface unit. The memory control unit 160 may include a descriptor processing block 200, a signal generation block 300, and an error correction code (ECC) block 400. While it is shown in FIG. 1 that the ECC block 400 is included in the memory control unit 160, it is to be noted that the ECC block 400 may be separated from the memory control unit 160.

The host interface unit 130 may interface the host device and the data storage device 100 corresponding to the protocol of the host device. For instance, the host interface unit 130 may communicate with the host device through any one of a universal serial bus (USB) protocol, a universal flash storage (UFS) protocol, a multimedia card (MMC) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The control unit 140 may analyze and process the request which is inputted from the host device. The control unit 140 may control the general operations of the controller 120 in response to the request of the host device. The control unit 140 may control the operations of the function blocks disposed in the controller 120, according to firmware or software for driving the data storage device 100. The control unit 140 may generate and store a descriptor DSC in a descriptor buffer memory, that is, a descriptor region of the working memory 150. The descriptor DSC may mean a work order indicating one or more works to be processed by the memory control unit 160 or a control signal to be generated by the memory control unit 160 to control the storage memory device 110. The control unit 140 may allocate a descriptor identifier (ID) DSC_ID for each generated descriptor DSC. The descriptor ID DSC_ID may correspond to memory space for a descriptor DSC in the working memory 150. In other words, the descriptor ID DSC_ID may correspond to address information of the descriptor DSC stored in the working memory 150.

The working memory 150 may store firmware or software to be driven by the control unit 140. Also, the working memory 150 may store data necessary to drive the firmware or the software. The working memory 150 may temporarily store data, which is identified with a data buffer memory address DT_ADD, to be transmitted from the host device to the storage memory device 110 or from the storage memory device 110 to the host device. Namely, the working memory 150 may operate as a data buffer memory. Further the working memory 150 may store the descriptor DSC corresponding to the descriptor address DSC_ADD. The working memory 150 may output the descriptor DSC and the temporarily stored data DT in response to the descriptor address DSC_ADD and the data buffer memory address DT_ADD from the descriptor processing block 200, respectively.

The memory control unit 160 may control the storage memory device 110 according to the descriptor DSC generated by the control unit 140 and stored in the working memory 150.

For instance, the memory control unit 160 may generate and output the control signals to the storage memory device 110 according to the descriptor DSC. The control signals may include a command and an address for controlling the storage memory device 110. The memory control unit 160 may provide the data, which is buffered in the working memory 150, to the storage memory device 110 according to the descriptor DSC.

The descriptor processing block 200 may receive a descriptor ID DSC_ID from the control unit 140. The descriptor processing block 200 may fetch the descriptor DSC from a descriptor buffer memory, for example, the descriptor storing region of the working memory 150. Also, the descriptor processing block 200 may output an instruction set IST_SET with a descriptor parameter DSC_PRM, which is extracted from the descriptor DSC and includes ECC information ECC_INFO, to the signal generation block 300. Further, the descriptor processing block 200 may output the obtained data DT and encoding information ENC_INFO to the ECC block 400.

The descriptor processing block 200 may provide the encoding information ENC_INFO and the obtained data DT to the ECC block 400 based on the descriptor DSC in order for the ECC block 400 to ECC-encode the obtained data DT, which is to be stored in the storage memory device 110. The descriptor processing block 200 may provide the instruction set IST_SET and the descriptor parameter DSC_PRM to the signal generation block 300 based on the descriptor DSC in order for the signal generation block 300 to generate control signals for controlling the storage memory device 110.

The descriptor processing block 200 may provide the encoding information ENC_INFO and the data DT to the ECC block 400 before providing the instruction set IST_SET and the descriptor parameter DSC_PRM to the signal generation block 300 such that the ECC block 400 may operate prior to the operation of the signal generation block 300. According to such control of the descriptor processing block 200, the ECC-encoded data, which is to be stored in the storage memory device 110, may be generated prior to the generation of the control signals to be provided to the storage memory device 110. According to such control of the descriptor processing block 200, the ECC block 400 may complete encoding the data DT while the signal generation block 300 is generating the control signals for the ECC-encoded data. As an example, the descriptor processing block 200 may have the ECC block 400 provide the ECC-encoded data to the signal generation block 300 at the same time or before the descriptor processing block 200 provides the instruction set IST_SET to the signal generation block 300. As another example, the descriptor processing block 200 may have the ECC block 400 provide the ECC-encoded data to the signal generation block 300 at the same time or before the signal generation block 300 completes the control signals for the ECC-encoded data.

The signal generation block 300 may generate the control signals to be provided to the storage memory device 110 based on the instruction set IST_SET and the descriptor parameter DSC_PRM, which are provided from the descriptor processing block 200. The signal generation block 300 may generate data signals to be provided to the storage memory device 110 based on the ECC-encoded data DT provided from the ECC block 400.

The ECC block 400 may ECC-encode or randomize data DT to be stored in the storage memory device 110 based on the encoding information ENC_INFO provided from the descriptor processing block 200.

Figure 2:
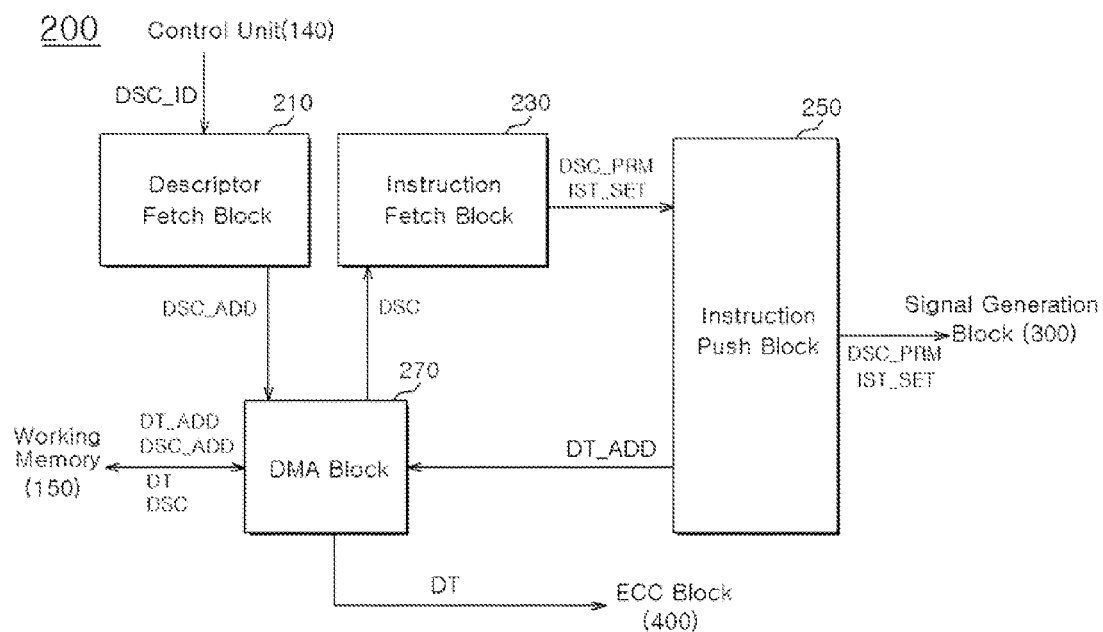
FIG. 2 is a block diagram exemplarily illustrating descriptor processing block of a memory control unit shown in FIG. 1.

FIG. 2 is a block diagram exemplarily illustrating the descriptor processing block 200 of the memory control unit 160 shown in FIG. 1.

Referring to FIG. 2 the descriptor processing block 200 may obtain the descriptor DSC from the working memory 150 based on the descriptor ID DSC_ID provided from the control unit 140. The descriptor processing block 200 may extract the descriptor parameter DSC_PRM and fetch the instruction set IST_SET based on the received descriptor DSC. The descriptor processing block 200 may output the fetched instruction set. IST_SET with the extracted descriptor parameter DSC_PRM to the signal generation block 300. The descriptor parameter DSC_PRM may include the data buffer memory address DT_ADD corresponding to the data DT temporarily stored in the working memory 150. The descriptor processing block 200 may obtain the temporarily stored data DT from the working memory 150 in response to the data buffer memory address DT_ADD, and output the obtained data DT to the ECC block 400. Further, the descriptor processing block 200 may generate the encoding information ENC_INFO based on the received descriptor DSC, and output the generated encoding information ENC_INFO to the ECC block 400.

The descriptor processing block 200 may include a descriptor fetch block 210, an instruction fetch block 230, an instruction push block 250, and a direct memory access (DMA) block 270.

The operation of fetching the descriptor generated by the control unit 140 may be performed by the descriptor fetch block 210 and the DMA block 270.

The descriptor fetch block 210 may receive the descriptor ID DSC_ID provided from the control unit 140. The descriptor fetch block 210 may generate the descriptor address DSC_ADD for the working memory 150, which corresponds to the descriptor ID DSC_ID provided from the control unit 140.

The descriptor fetch block 210 may request the DMA block 270 to read the descriptor DSC corresponding to the descriptor address DSC_ADD. To this end, the descriptor fetch block 210 may provide the descriptor address DSC_ADD to the DMA block 270.

The DMA block 270 may read the descriptor DSC stored in the working memory 150 based on the received descriptor address DSC_ADD. The DMA block 270 may provide the read descriptor DSC to the instruction fetch block 230.

The operation of decoding the read descriptor DSC and fetching the instruction set IST_SET based on the decoded descriptor DSC may be performed by the instruction fetch block 230.

The instruction fetch block 230 may fetch the instruction set IST_SET corresponding to the read descriptor DSC based on instruction set fetch information included in the read descriptor DSC. For example, the instruction fetch block 230 may fetch the instruction set IST_SET from an instruction memory (not shown) disposed therein based on the instruction set fetch information included in the read descriptor DSC. The instruction fetch block 230 may extract the descriptor parameter DSC_PRM from the received descriptor DSC. The instruction fetch block 230 may provide the instruction set IST_SET and the corresponding descriptor parameter DSC_PRM to the instruction push block 250.

The instruction push block 250 may transfer the instruction set IST_SET and the corresponding descriptor parameter DSC_PRM from the instruction fetch block 230 to the signal generation block 300 to generate the control signals to be provided to the storage memory device 110.

Before transferring the instruction set IST_SET and the descriptor parameter DSC_PRM to the signal generation block 300, the instruction push block 250 may request the DMA block 270 to provide the data DT, which is temporarily stored in the working memory 150 and is to be provided to the storage memory device 110, to the ECC block 400. To this end, the instruction push block 250 may provide the data buffer memory address DT_ADD included in the descriptor parameter DSC_PRM to the DMA block 270. Further, before transferring the instruction set IST_SET and the descriptor parameter DSC_PRM to the signal generation block 300, the instruction push block 250 may request the ECC block 400 to perform an ECC encoding operation for the data DT provided from the DMA block 270. To this end, the instruction push block 250 may provide the encoding information ENC_INFO to the ECC block 400 based on the received descriptor parameter DSC_PRM.

The DMA block 270 may access the working memory 150 in response to the data buffer memory address DT_ADD to read the temporarily stored data DT corresponding to the data buffer memory address DT_ADD. The DMA block 270 may provide the temporarily stored data DT corresponding to the data buffer memory address DT_ADD to the ECC block 400.

Figure 3:
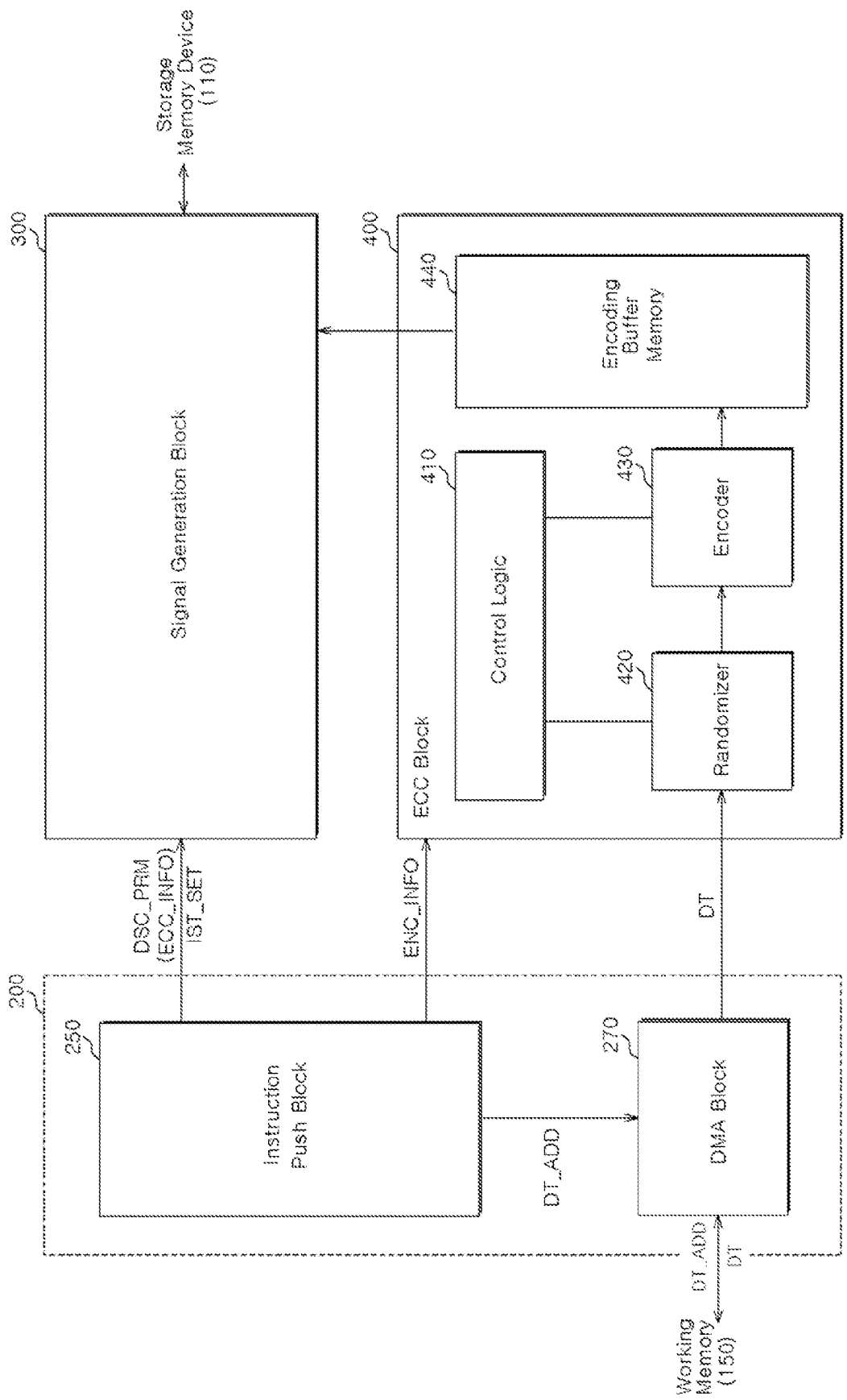
FIG. 3 is a block diagram exemplarily illustrating a signal generation block and an error correction code block of a memory control unit shown in FIG. 1.

FIG. 3 is a block diagram exemplarily illustrating the signal generation block 300 and the ECC block 400 of the memory control unit 160 shown in FIG. 1.

Referring to FIG. 3, the ECC block 400 may include a control logic 410, a randomizer 420, an encoder 430, and an encoding buffer memory 440. The control logic 410 may control the general operations of the ECC block 400 based on the encoding information ENC_INFO.

For example, the control logic 410 may activate or deactivate the randomizer 420 based on randomization performance information, which may be included in the encoding information ENC_INFO. When activated according to the control of the control logic 410, the randomizer 420 may randomize the data DT provided from the DMA block 270 based on seed information which may be included in the encoding information ENC_INFO. When deactivated according to the control of the control logic 410, the randomizer 410 may bypass the data DT provided from the DMA block 270 and directly transmit the data DT to the encoder 430.

For another example, the control logic 410 may activate or deactivate the encoder 430 based on the ECC performance information, which may be included in the encoding information ENC_INFO. When activated according to the control of the control logic 410, the encoder 430 may encode the data DT provided from the randomizer 420, and store the encoded data in the encoding buffer memory 440. When deactivated according to the control of the control logic 410, the encoder 430 may bypass the data provided from the randomizer 420 and store the data in the encoding buffer memory 440.

The encoder 430 may perform an ECC encoding operation according to various ECC algorithms including but not limited to a Bose-Chaudhari-Hocquenghem (BCH) algorithm, a Reed Solomon (RS) algorithm, a turbo code algorithm, a low density parity check (LPC) algorithm, and so forth. The encoding buffer memory 440 may provide the data stored therein to the signal generation block 300.

The signal generation block 300 may generate the control signals based on the instruction set IST_SET and the corresponding descriptor parameter DSC_PRM provided from the instruction push block 250. The descriptor parameter DSC_PRM may include the ECC information ECC_INFO. The signal generation block 300 may read the data stored in the encoding buffer memory 440 based on the ECC information ECC_INFO. The signal generation block 300 may generate data signals to be provided to the storage memory device 110 based on the data read out from the encoding buffer memory 440.

As may be seen from the operation of the data storage device explained above, the instruction push block 250 may sequentially perform the operations of instructing the DMA block 270 to read data DT to be stored in the storage memory device 110, instructing the ECC block 400 to ECC-encode the data DT provided from the DMA block 270, and instructing the signal generation block 300 to generate data signals based on the ECC-encoded data and generate control signals for controlling the storage memory device 110. According to the sequential instructions of the instruction push block 250, the ECC block 400 may be operated prior to the operation of the signal generation block 300, which may lead to the completion of the ECC encoding of the data prior to the generation of the control signal to be provided to the storage memory device 110, and thus may improve the operation speed of the data storage device.

Figure 4:
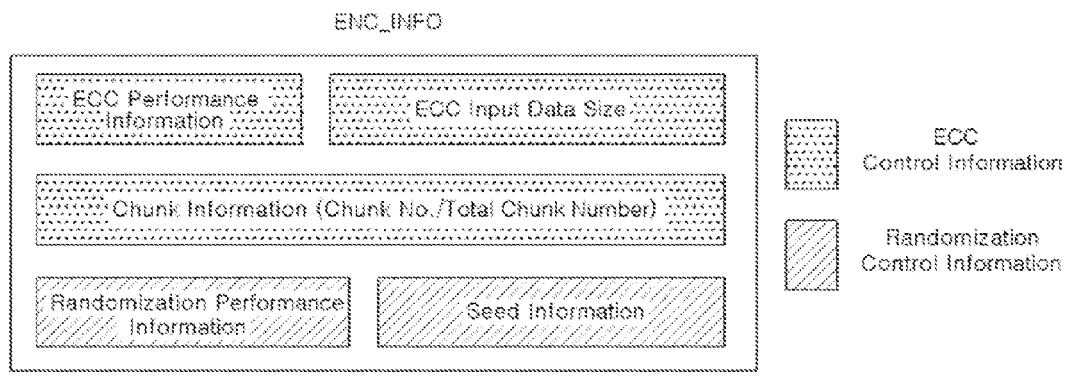
FIG. 4 is a signal structure illustrating encoding information in accordance with an embodiment of the present disclosure.

FIG. 4 is a signal structure illustrating the encoding information ENC_INFO in accordance with an embodiment of the present disclosure. The encoding information ENC_INFO may include information necessary for the ECC block 400 to perform the ECC encoding operation. Referring to FIG. 4, the encoding information ENC_INFO may include ECC control information including the ECC performance information for instructing whether to perform the ECC encoding operation, the size information of data subject to the ECC operation, and the information ("Chunk Information (Chunk No./Total Chunk Number)") related with a unit of ECC encoding, for example a chunk of YAFFS (Yet Another Flash File System). The information related with the unit of ECC encoding may indicate an order in the total unit number of the ECC encoding. The encoding information ENC_INFO may further include randomization control information comprising the randomization performance information for instructing whether to perform the randomizing operation and the seed information for the randomizing operation.

Figure 5:
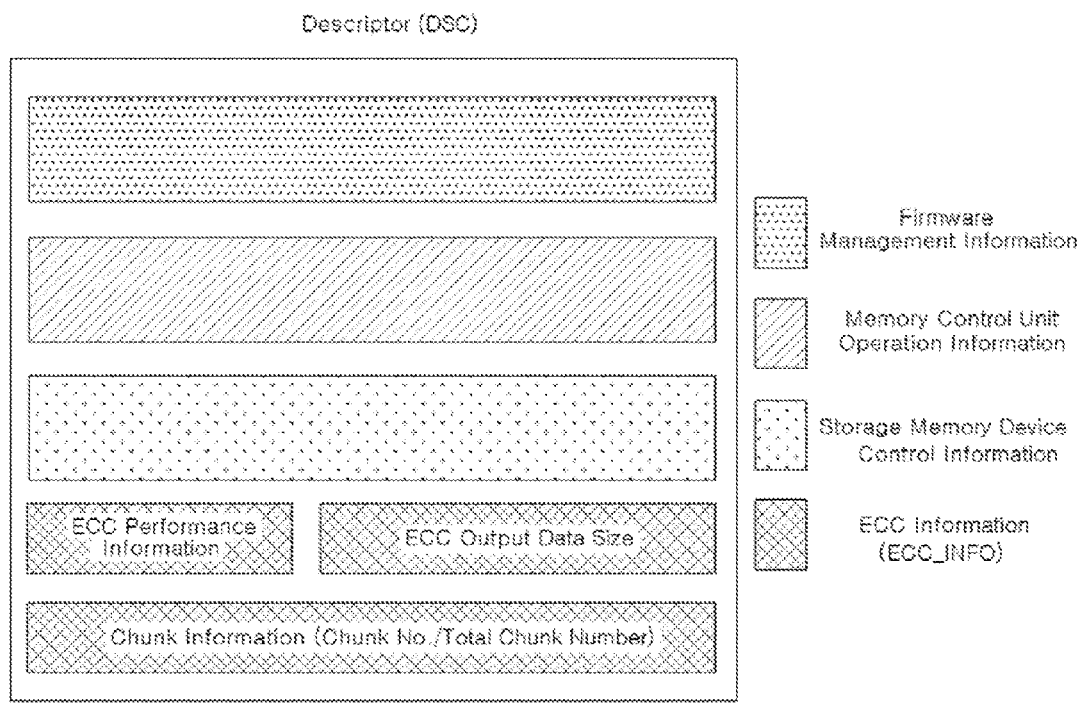
FIG. 5 is a signal structure illustrating a descriptor in accordance with an embodiment of the present disclosure.

FIG. 5 is a signal structure illustrating the descriptor DSC in accordance with an embodiment of the present disclosure.

The control unit 140 may generate the descriptor DSC and the memory control unit 160 may perform operations according to the descriptor DSC. For this reason, the descriptor DSC may include information ("Firmware Management Information") to be managed by the control unit 140 (or the firmware driven by the control unit 140), information ("Memory Control Unit Operation Information") for the operation of the memory control unit 160, information ("Storage Memory Device Control Information") for the memory control unit 160 to control the storage memory device 110, and the ECC information ECC_INFO.

For instance, the information to be managed by the control unit 140 may include descriptor ID DSC_ID information, which is allocated when the descriptor DSC is generated, state information, which is reported to the control unit 140 or is referred to by the control unit 140 as a processing result of the descriptor DSC, and the address information of the descriptor region of the working memory 150.

For instance, the information for the operation of the memory control unit 160 may include the address information of a data buffer region of the working memory 150 where data to be stored in the storage memory device 110 or data read from the storage memory device 110 may be temporarily stored. Also, the information for the operation of the memory control unit 160 may include the address information of the instruction set stored in the instruction fetch block 230.

The information for the memory control unit 160 to control the storage memory device 110 may include command information and address information to be provided to the storage memory device 110, and size information of data to be stored in the storage memory device 110 or data read from the storage memory device 110.

Also, the descriptor DSC may include the ECC information ECC_INFO comprising ECC performance information for instructing whether to perform the ECC encoding operation, the size information ("ECC Output Data Size") of the ECC-encoded data to be outputted from the ECC block 400 to the signal generation block 300, and the information ("Chunk Information (Chunk No./Total Chunk Number)") related with the unit of ECC encoding.

Figure 6:
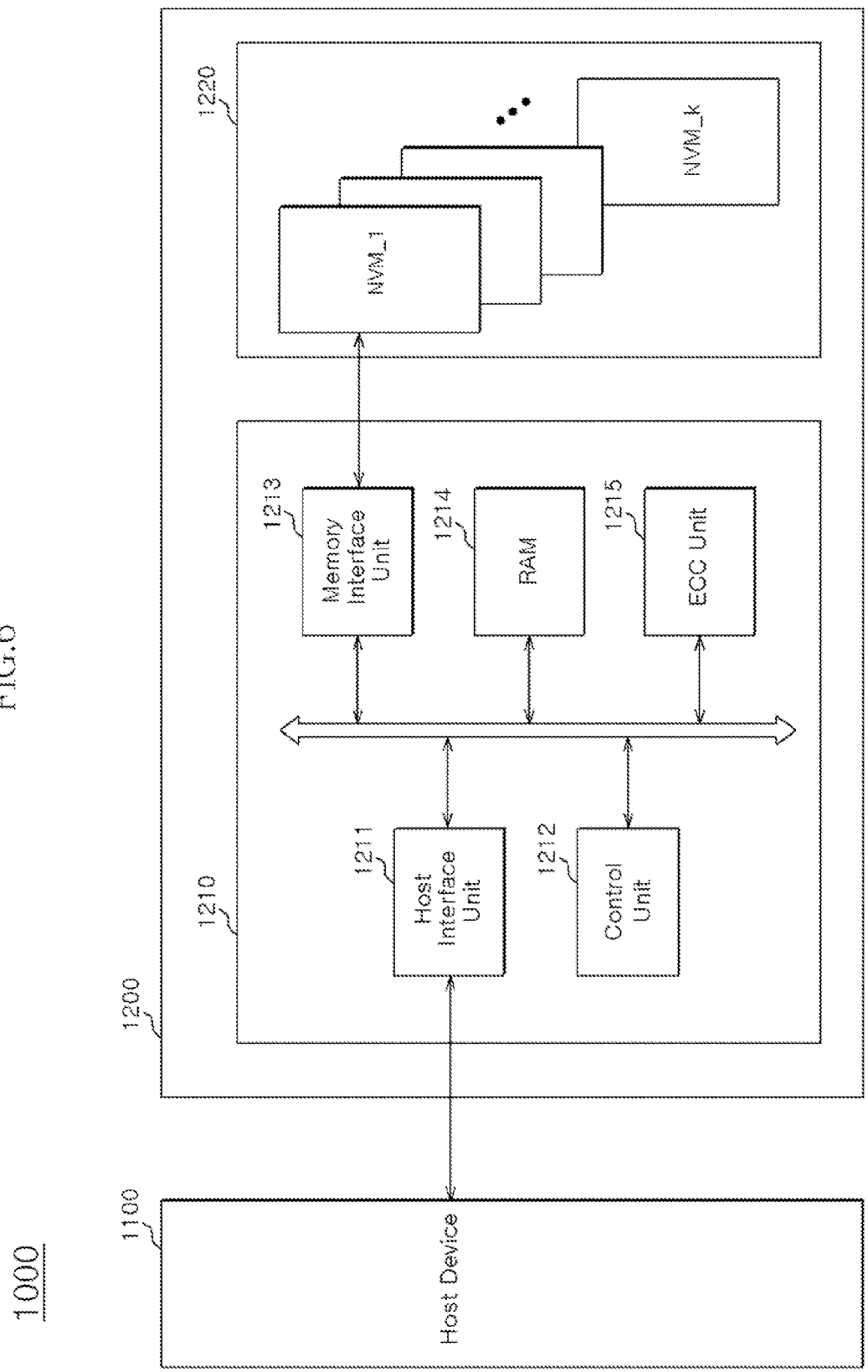
FIG. 6 is a block diagram exemplarily illustrating a data processing system in accordance with an embodiment of the present disclosure.

FIG. 6 is a block diagram exemplarily illustrating a data processing system in accordance an embodiment of the present disclosure. Referring to FIG. 6, a data processing system 1000 may include a host device 1100 and a data storage device 1200.

The data storage device 1200 may include a controller 1210, and a storage memory device 1220. The data storage device 1200 may be coupled to a host device 1100 such as a mobile phone, an MP3 player, a laptop computer, a desktop computer, a game player, a TV, an in-vehicle infotainment system, and so forth. The data storage device 1200 is also referred to as a memory system.

The controller 1210 may access the storage memory device 1220 in response to a request from the host device 1100. For example, the controller 1210 may control the read, program or erase operations of the storage memory device 1220. The controller 1210 may drive firmware for controlling the storage memory device 1220.

The controller 1210 may include a host interface unit 1211, a control unit 1212, a memory interface unit 1213, a RAM 1214, and an ECC unit 1215.

The control unit 1212 may control the general operations of the controller 1210 in response to a request from the host device 1100. The RAM 1214 may serve as a working memory of the control unit 1212. The RAM 1214 may also serve as a buffer memory for temporarily storing the data read from the storage memory device 1220 or the data provided from the host device 1100.

The host interface unit 1211 may interface the host device 1100 and the controller 1210. For example, the host interface unit 1211 may communicate with the host device 1100 through one of various interface protocols such as a universal serial bus (USB) protocol a universal flash storage (UFS) protocol, a multimedia card (MMC) protocol, a peripheral component interconnection (PCI) protocol, a PCI express (PCI-E) protocol, a parallel advanced technology attachment (DATA) protocol, a serial ATA (SATA) protocol, a small computer system interface (SCSI) protocol, and a serial attached SCSI (SAS) protocol.

The memory interface unit 1213 may interface the controller 1210 and the storage memory device 1220. The memory interface unit 1213 may provide commands and addresses to the storage memory device 1220. Furthermore, the memory interface unit 1213 may exchange data with the storage memory device 1220.

The memory interface unit 1213 and the ECC unit 1215 may correspond to the memory control unit 160 described above with reference to FIGS. 1 to 5.

The ECC unit 1215 may detect an error of the data read from the storage memory device 1220. Also, the ECC unit 1215 may correct the detected error when the detected error is within a correctable range. Meanwhile, the ECC unit 1215 may be included in the memory interface unit 1213 as described above with reference to FIGS. 1 to 5.

The storage memory device 1220 may serve as the storage medium of the data storage device 1200. The storage memory device 1220 may include a plurality of storage memory chips (or dies) NVM_1 to NVM_k.

The controller 1210 and the storage memory device 1220 may be one of various data storage devices. The various data storage devices may include but not be limited to a multi-media card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and so forth.

Figure 7:
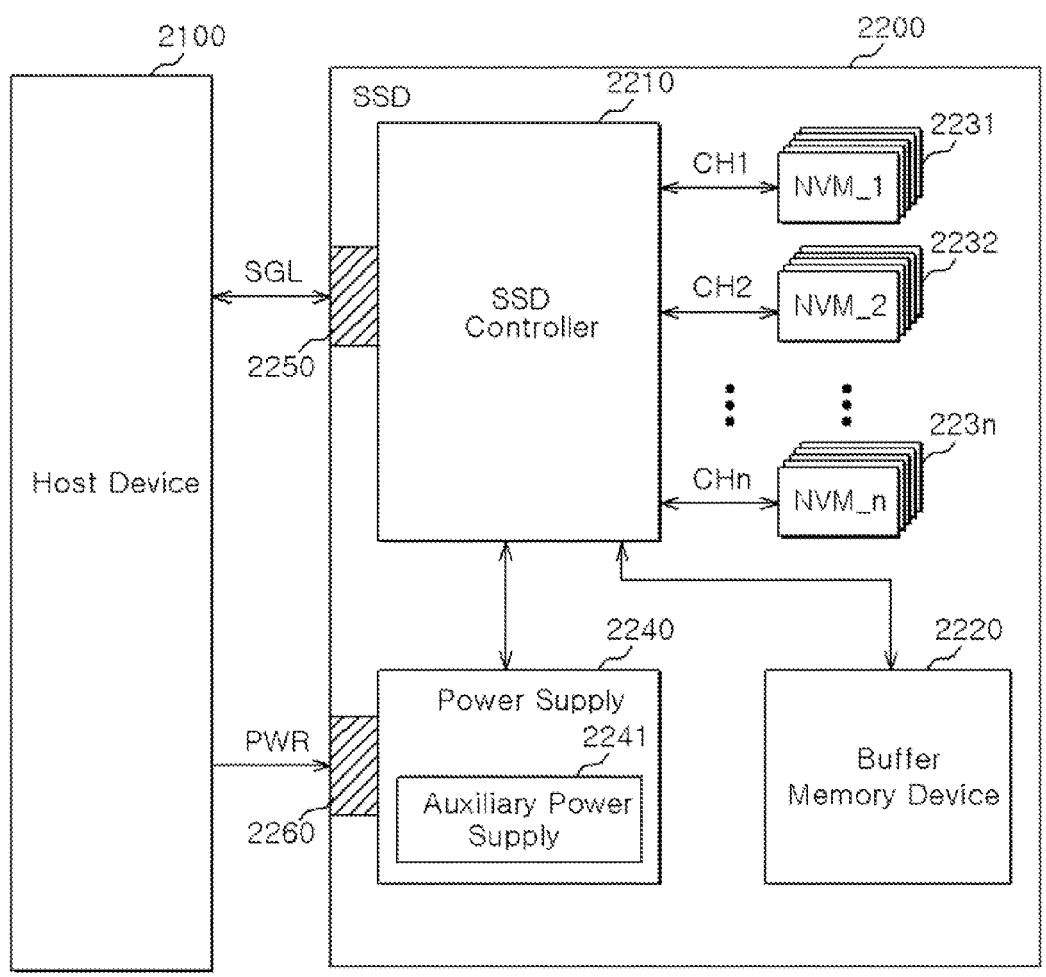
FIG. 7 is a block diagram exemplarily illustrating a data processing system including a solid state drive (SSD) in accordance with an embodiment of the present disclosure.

FIG. 7 is a block diagram exemplarily illustrating a data processing system including a solid state drive (SSD) in accordance with an embodiment of the present disclosure Referring to FIG. 7, a data processing system 2000 may include a host device 2100 and a solid state drive (SSD) 2200.

The SSD 2200 may include an SSD controller 2210, the buffer memory device 2220, storage memory devices 2231 to 223n, a power supply 2240, a signal connector 2250, and a power connector 2260.

The SSD 2200 may operate in response to a request from the host device 2100. That is, the SSD controller 2210 may access the storage memory devices 2231 to 223n in response to a request from the host device 2100. For example, the SSD controller 2210 may control the read, program and erase operations of the storage memory devices 2231 to 223n.

The buffer memory device 2220 may temporarily store data, which is to be stored in the storage memory devices 2231 to 223n. Further, the buffer memory device 2220 may temporarily store data, which is read from the storage memory devices 2231 to 223n. The data temporarily stored in the buffer memory device 2220 may be transmitted to the host device 2100 or the storage memory devices 2231 to 223n under the control of the SSD controller 2210.

The storage memory devices 2231 to 223n may serve as storage media of the SSD 2200. The storage memory devices 2231 to 223n may be electrically coupled to the SSD controller 2210 through a plurality of channels CH1 to CHn, respectively. One or more storage memory devices may be electrically coupled to one channel. The storage memory devices electrically coupled to one channel may be electrically coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may include but not be limited to parallel advanced technology attachment (PATH), serial advanced technology attachment (SATA), small computer system interface (SCSI), serial attached SCSI (SAS), peripheral component interconnection (PCI) and PCI express (PCI-E) protocols, according to the interface scheme between the host device 2100 and the SSD 2200.

Figure 8:
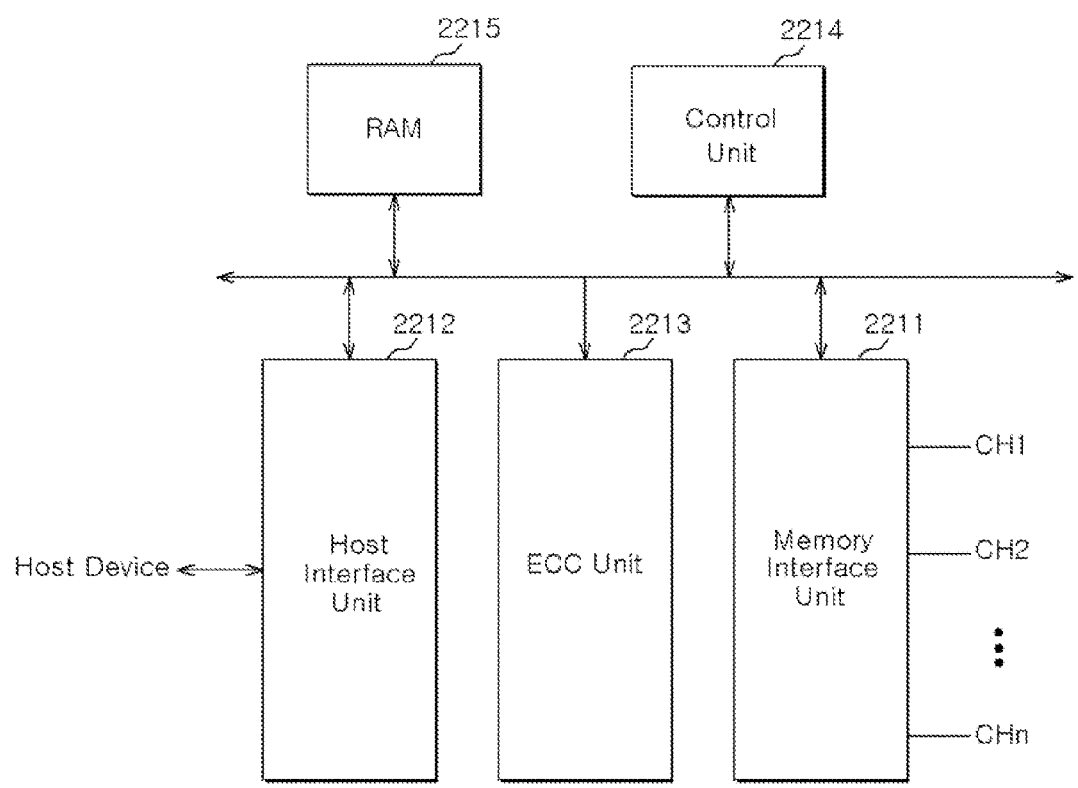
FIG. 8 is a block diagram exemplarily illustrating an SSD controller shown in FIG. 7.

FIG. 8 is a block diagram exemplarily illustrating the SSD controller shown in FIG. 7. Referring to FIG. 8, the SSD controller 2210 may include a memory interface unit 2211, a host interface unit 2212 an error correction code (ECC) unit 2213, a control unit 2214, and a RAM 2215.

The memory interface unit 2211 may provide a control signal such as a command and an address to the storage memory devices 2231 to 223n. Moreover, the memory interface unit 2211 may exchange data with the storage memory devices 2231 to 223n. The memory interface unit 2211 may scatter the data transmitted from the buffer memory device 2220 to the respective channels CH1 to CHn under the control of the control unit 2214. Furthermore, the memory interface unit 2211 may transmit the data read from the storage memory devices 2231 to 223n to the buffer memory device 2220 under the control of the control unit 2214.

The memory interface unit 2211 and the ECC unit 2213 may correspond to the memory control unit 160 described above with reference to FIGS. 1 to 5.

The host interface unit 2212 may provide an interface with the SSD 2200 in correspondence to the protocol of the host device 2100. For example, the host interface unit 2212 may communicate with the host device 2100 through one of parallel advanced technology attachment (DATA), serial advanced technology attachment (SATA), small computer system interface (SCSI), serial attached SCSI (SAS), peripheral component interconnection (PCI) and PCI express (PCI-E) protocols. In addition, the host interface unit 2212 may serve as a disk emulator so that the host device 2100 may recognize the SSD 2200 as a hard disk drive (HDD).

The ECC unit 2213 may generate parity bits based on the data transmitted to the storage memory devices 2231 to 223n. The generated parity bits may be stored in spare areas of the storage memory devices 2231 to 223n. The ECC unit 2213 may detect an error of the data read from the storage memory devices 2231 to 223n. When the detected error is within a correctable range, the ECC unit 2213 may correct the detected error. Meanwhile, the ECC unit 2213 may be included in the memory interface unit 2211 as described above with reference to FIGS. 1 to 5.

The control unit 2214 may analyze and process the signal SGL inputted from the host device 2100. The control unit 2214 may control the general operations of the SSD controller 2210 in response to a request from the host device 2100. The control unit 2214 may control the operations of the buffer memory device 2220 and the storage memory devices 2231 to 223n according to firmware for driving the SSD 2200. The RAM 2215 may serve as a working memory for driving the firmware.

Figure 9:
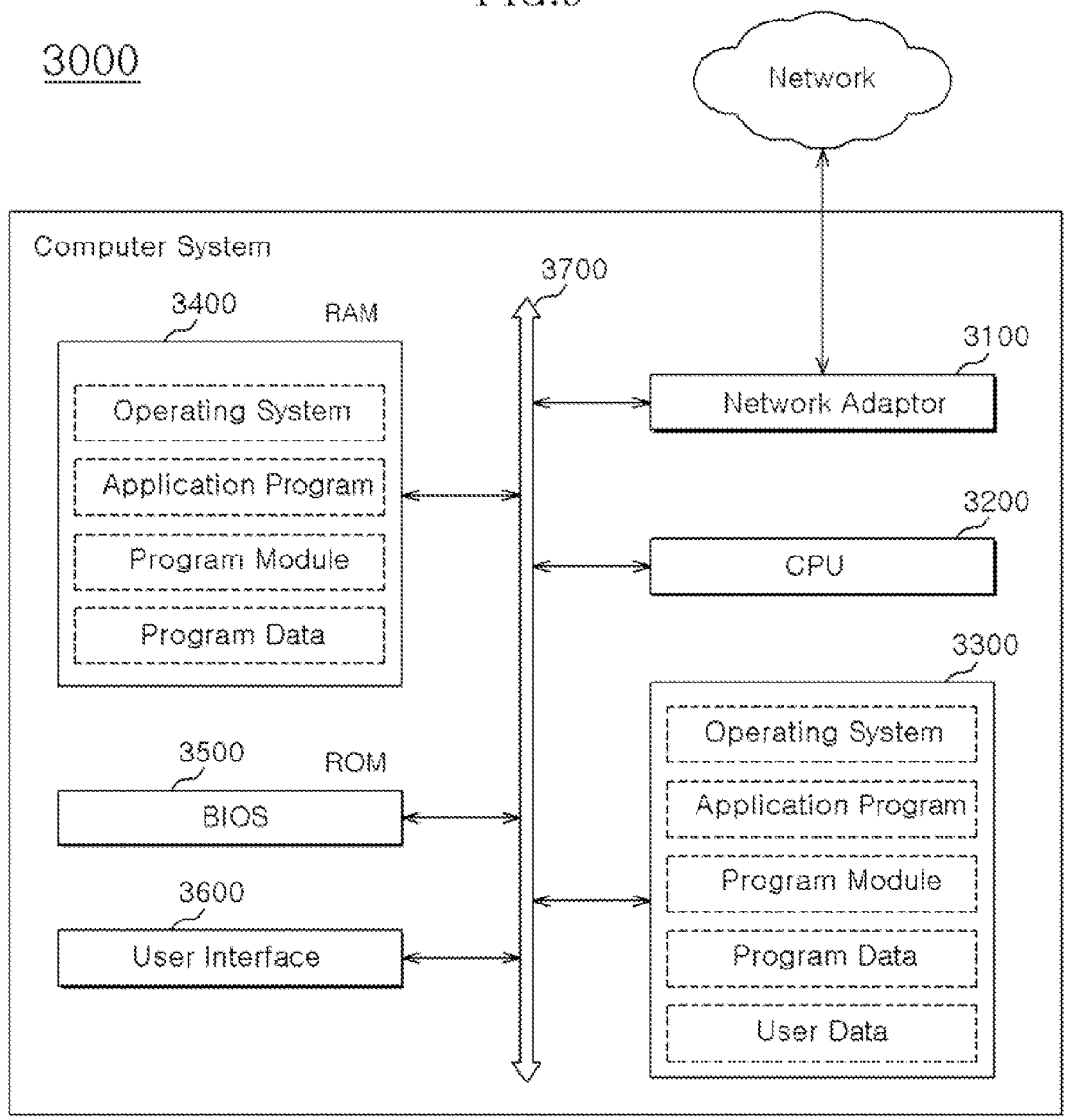
FIG. 9 is a block diagram exemplarily illustrating a computer system including a data storage device in accordance with an embodiment of the present disclosure.

FIG. 9 is a block diagram exemplarily illustrating a computer system 3000 including a data storage device in accordance with an embodiment of the present disclosure. Referring to FIG. 9, the computer system 3000 may include a network adaptor 3100, a central processing unit 3200, a data storage device 3300, a RAM 3400, a ROM 3500 and a user interface 3600, which are electrically coupled to a system bus 3700. The data storage device 3300 may include the data storage device 100, the data storage device 1200, or the SSD 2200 described above with reference to FIGS. 1 to 7.

The network adaptor 3100 may provide interfacing between the computer system 3000 and external networks. The central processing unit 3200 may perform general operations for driving an operating system residing at the RAM 3400 or an application program.

The data storage device 3300 may store general data necessary in the computer system 3000. For example, an operating system for driving the computer system 3000, an application program, various program modules, program data and user data may be stored in the data storage device 3300.

The RAM 3400 may serve as a working memory device of the computer system 3000. Upon booting, the operating system, the application program, the various program modules and the program data necessary for driving programs, which are read from the data storage device 3300, may be loaded on the RAM 3400. A basic input/output system (BIOS), which is activated before the operating system is driven, may be stored in the ROM 3500. Information exchange between the computer system 3000 and a user may be implemented through the user interface 3600.

Although not shown in the figures, the computer system 3000 may further include devices such as an application chipset, a camera image processor, and so forth.

While certain embodiments have been described above, it will be understood to those skilled in the art that the embodiments described are for example only. Accordingly, the memory control unit and the data storage device including the same described here should not be limited based on the described embodiments. Rather, the memory control unit and the data storage device including the same described herein should only be limited in light of the claims that follow when taken in conjunction with the above description and accompanying drawings.

What is claimed is:

1. A data storage device comprising:
   a storage memory device;
   an error correction code (ECC) block configured to ECC-encode data for storing in the storage memory device; and
   a signal generation block configured to generate control signals for controlling the storage memory device and data signals for storing the ECC-encoded data in the storage memory device, and provide the control signals and the data signals to the storage memory device,
   wherein the ECC block ECC-encodes the data before the signal generation block generates the control signals, and
   wherein the storage memory device stores the ECC-encoded data based on the control signals and the data signals provided from the signal generation block.

2. The data storage device according to claim 1, further comprising a descriptor processing block configured to fetch a descriptor, which describes a work for controlling the storage memory device; provide an instruction set, which instructs the signal generation block to generate the control signals on the basis of the descriptor, and a descriptor parameter, which is extracted from the descriptor; and provide encoding information, which instructs the ECC block to ECC-encoding the data on the basis of the descriptor.

3. The data storage device according to claim 2, wherein the descriptor processing block provides the encoding information to the ECC block prior to providing the instruction set to the signal generation block.

4. The data storage device according to claim wherein the descriptor processing block comprises:
   a direct memory access (DMA) block configured to read the descriptor from a working memory;
   a descriptor fetch block configured to control the DMA block to read the descriptor;
   an instruction fetch block configured to fetch the instruction set based on the descriptor; and
   an instruction push block configured to provide the instruction set and the descriptor parameter to the signal generation block, and providing the encoding information to the ECC block.

5. The data storage device according to claim 4, wherein the instruction push block provides an address of the working memory where the data is stored to the DMA block based on the descriptor.

6. The data storage device according to claim 5, wherein the DMA block reads the data from the working memory based on the address of the working memory, and provides the read data to the ECC block.

7. The data storage device according to claim 4, further comprising a control unit configured to generate the descriptor, and storing the descriptor in the working memory.

8. The data storage device according to claim 4, wherein the ECC block comprises:
   a randomizer configured to randomize data inputted from the DMA block;
   an encoder configured to ECC-encode data inputted from the randomizer; and
   a control logic configured to activate or deactivate the randomizer based on a randomization control information included in the encoding information, and activate or deactivate the encoder based on an ECC control information included in the encoding information.

9. The data storage device according to claim 8, wherein the randomizer bypass the data inputted from the DMA block to the encoder when deactivated.

10. A memory control unit comprising:
    a direct memory access (DMA) block configured to read data from a working memory;
    an error correction code (ECC) block configured to ECC-encode data provided from the DMA block;
    a signal generation block configured to generate a data signal for providing to a memory device based on the data encoded by the ECC block, and generate a control signal for providing to the memory device; and
    an instruction push block configured to instruct the DMA block to read the data, and then instruct the ECC block to ECC-encode the data read by the DMA block, and then instruct the signal generation block to generate the data signal and the control signal so that the ECC block completes the ECC-encoding of the data before the signal generation block completes the generation of the control signal, and wherein the memory device stores the data encoded by the ECC block based on the control signal and the data signal provided from the signal generation block.

11. The memory control unit according to claim 10, wherein the DMA block further reads a descriptor, which describes a work for controlling the memory device, from the working memory, further comprising:
    a descriptor fetch block configured to control the DMA block to read the descriptor; and
    an instruction fetch block configured to fetch an instruction set for instructing the generation of the control signal based on the descriptor, and extracting a descriptor parameter from the descriptor.

12. The memory control unit according to claim 11, herein the instruction push block provides an address of the working memory where the data is stored to the DMA block based on the descriptor parameter.

13. The memory control unit according to claim 12, wherein the instruction push block provides encoding information, which instructs the ECC block to ECC-encode the data, based on the descriptor parameter.

14. The memory control unit according to claim 13, wherein the instruction push block provides the instruction set and the descriptor parameter to the signal generation block.

15. The memory control unit according to claim 14, wherein the instruction push block provides the encoding information to the ECC block prior to providing the instruction set and the descriptor parameter to the signal generation block.

16. A control apparatus for controlling a storage memory device, comprising:
    an instruction unit configured to generate an instruction, an encoding information, and a data request;
    an error correction code (ECC) unit configured to ECC-encode a data based on the encoding information;
    a signal generation unit configured to generate a control signal for controlling the storage memory device, and a data signal for storing the ECC-encoded data in the storage memory device in response to the instruction and provide the control signal and the data signal to the storage memory device; and
    a buffer unit configured to temporarily store the data provided from a host device, and provide the data stored therein to the ECC unit based on the data request,
    wherein the instruction unit provides the data request to the buffer unit, and then provides the encoding information to the ECC unit, and then provides the instruction to the signal generation unit so that the ECC unit completes the ECC-encoding of the data before the signal generation unit completes the generation of the control signal, and
    wherein the storage memory device stores the ECC-encoded data based on the control signal and the data signal provided from the signal generation unit.

17. The control apparatus of claim 16, wherein the instruction unit generates the instruction, the encoding information, and the data request based on a descriptor indicating one or more works for controlling the storage device.

18. The control apparatus of claim 17, wherein the buffer unit further stores the descriptor.

* * * * *